United States Patent Office 3,143,743
Patented Aug. 11, 1964

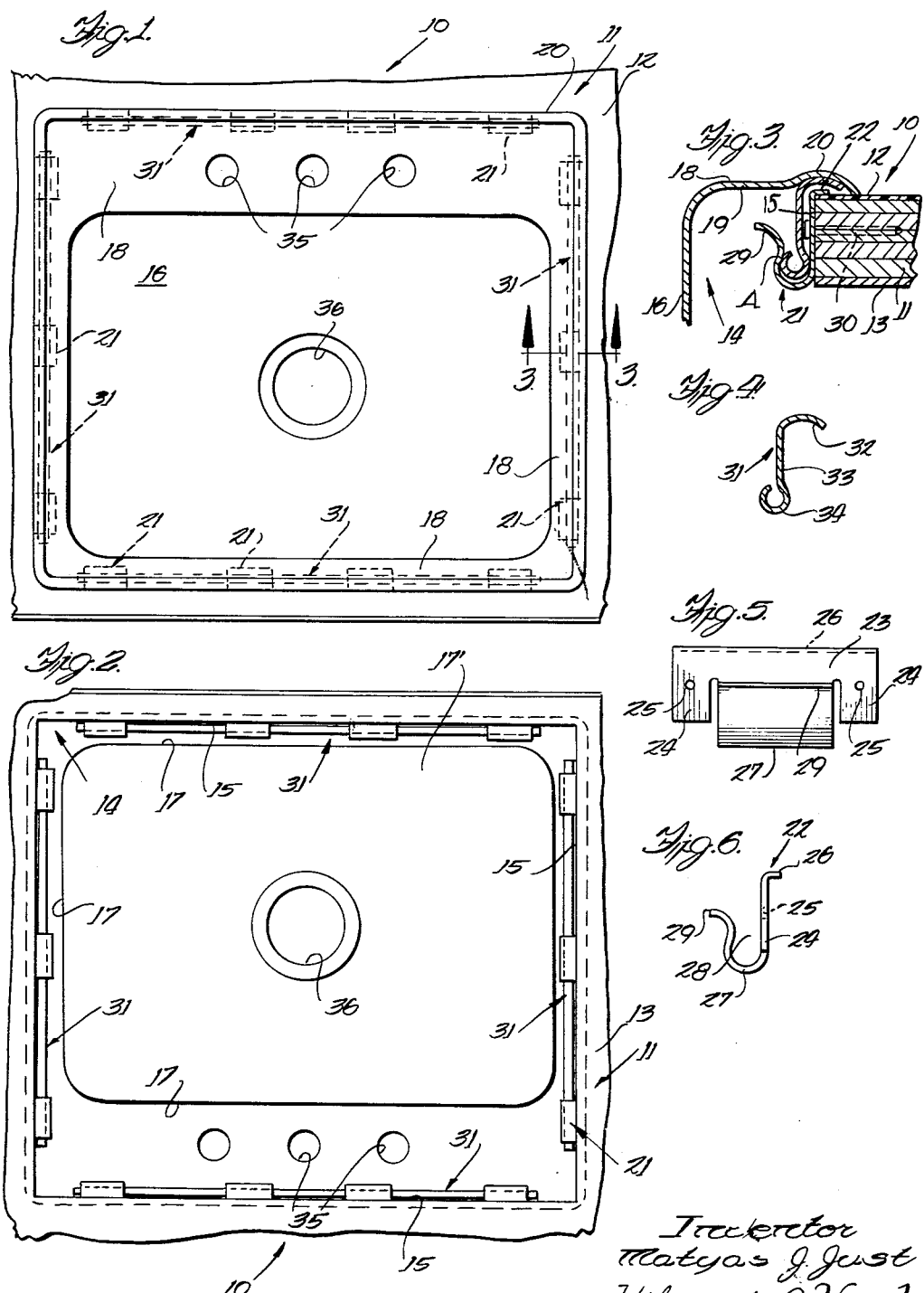

3,143,743
SNAP-IN SINK BOWL CLAMPING
ARRANGEMENT
Matyas J. Just, Chicago, Ill., assignor to Just Manufacturing Company, a corporation of Illinois
Filed Jan. 21, 1963, Ser. No. 252,708
1 Claim. (Cl. 4—187)

This invention relates to a sink and drainboard mounting arrangement. More particularly the invention relates to a snap-in type of clamping and attaching structure for securing a sink bowl within the opening of a drainboard.

It is a prime object of this invention to provide an improved mounting construction whereby a sink may be quickly attached within the opening of a drainboard.

Another object is the provision of an improved snap-in type of sink bowl construction wherein clamping means is provided which will permit the sink bowl to be resiliently snapped into the opening of a drainboard and which will permit the quick disassembly of the sink bowl from the drainboard, if desired.

A still further object is the provision of a sink bowl clamping arrangement wherein the sink bowl can quickly be installed in position within the opening of a drainboard and can also be quickly removed by the installer, if so desired.

A still further object is the provision of a snap-in type of clamping assembly including a plurality of spring-like clamping elements which are mounted on the drainboard and which are adapted to resiliently engage connecting projecting members which are attached to the rim of the sink bowl.

A still further object is the provision of a snap-in type of clamping arrangement for securing a sink bowl within the opening of a drainboard wherein no special tools are required for the final fastening of the sink bowl in position.

A more specific object of the invention is the provision of a snap-in type of clamping arrangement for sink bowls comprising a plurality of resilient fasteners having resilient jaws which during assembly of the sink bowl with the drainboard are sprung apart by connecting elements on a sink bowl and which without special tooling return to their normal position resiliently securing said sink bowl in position.

These and other objects will become more readily apparent from a reading of the description when examined in connection with the accompanying sheet of drawing.

In the drawing:

FIGURE 1 is a plan view of a sink bowl secured in position on a portion of a counter or drainboard;

FIGURE 2 is a bottom view, showing a sink bowl secured in position on a portion of a counter top illustrating an improved clamping arrangement;

FIGURE 3 is a cross sectional view taken along the line 3—3 of FIGURE 1;

FIGURE 4 is a cross sectional view through a connecting element secured to the rim of a sink bowl;

FIGURE 5 is a detail elevational view of a spring clip; and

FIGURE 6 is a side elevational view of the spring clip shown in FIGURE 5.

Referring now particularly to FIGURES 1 and 2 a sink structure is generally designated by the reference character 10. The sink structure 10 comprises a drainboard or counter top 11 of conventional laminated construction having a top surface 12 and a bottom surface 13. An opening 14 is provided in the drainboard 11 and is defined by a vertical facing edge 15 extending coextensively with said opening 14.

A sink bowl is generally designated at 16 and includes vertical bowl sides 17 and a bottom 17' as best shown in FIGURE 2. The bowl sides 17 have connected thereto at their upper ends an outwardly projecting rim 18 extending completely around said bowl 16 and horizontally with respect thereto. The rim 18 has an underneath side designated at 19 and is provided at its outermost edge with a coextensive arcuate edge portion 20 which is adapted to rest or engage the top surface 12 of the drainboard 11 immediately adjacent the opening 14.

A plurality of clamping structures of the snap-in type are designated by the reference character 21. These clamping structures 21 each comprise a spring-clip 22, best shown in FIGURES 3, 5, and 6. Each spring clip 22 consists of a vertical support plate 23 having supporting ears 24 each of which is provided with a nail hole 25. The upper end of the support plate 23 is provided with a flange 26 which engages the upper peripheral edge of the top surface 12 which is immediately adjacent the opening 14. Each spring clip 22 is provided with a spring loop 27 integral with the plate 23 and constructed of a resilient spring-like material, said loop 27 being bent on itself and extending upwardly to provide an opening designated at 28. The spring loop 27 is so shaped as to provide in effect a pocket having a restricted opening at its upper end, the said loop 27 being so disposed that it may be sprung outwardly to provide said opening for receiving a connecting element as will be described below, whereupon it will again return to its original shape due to its own inherent resiliency. The spring loop 27 is also provided with a tongue 29 which is of arcuate shape and curves upwardly and outwardly away from the opening 28.

As best shown the spring clips are attached to the drainboard 11 by placing the vertical plates 23 against the vertical facing edge 15 and then securing nails 30 through the openings 25 into the drainboard 11 which may be of a plywood construction.

Four elongated connection elements are generally designated at 31 as best shown in FIGURE 2 and in FIGURE 4. It is contemplated, of course, that the sink bowl 16 may also be of circular or round construction wherein one single cylindrical connecting element 31 may be provided instead of the four as shown in the rectangular type of sink construction. Each connecting element 31 is provided at its upper end with an arcuate connecting flange 32 which is suitably welded to the arcuate edge portion 20 of the rim 18. Each connecting element 31 also includes a vertical plate or support 33 which projects downwardly into the opening 14 and is provided at its bottom with an integral loop forming in effect a cylindrical projection or bulbous portion 34 which is coextensive with the vertical support 33 of the connecting element 31.

As best shown in FIGURES 1 and 2 the sink bowl 16 is provided with the conventional faucet securing openings 35 and drain opening 36.

In assembly of the sink bowl 16 with the drainboard 11 a plurality of the clips 22 are fastened to the facing edge 15 in the manner shown in FIGURE 3. This is a simple matter since only two nails have to be driven into the drainboard 11 for each clip. The sink bowl may now be secured in the assembly and the operator places the sink bowl 16 into the opening 14 and merely presses downwardly along the rim 18 whereupon each cylindrical projection or bulbous portion 34 engages the tongue 19 to spring the spring loop so that it opens the opening 28 and whereupon the cylindrical projections 34 are snapped into the pockets formed by the spring loops. Thus, the spring loops may be likened to jaws which open outwardly during the downward pressure of the cylindrical projections 34 and whereupon when the projections are seated within the spring loops the spring-loops or jaws again close and securely clamp the sink bowl in the desired position. The spring loop is so shaped as to exert a constant tension or downward force on the bulbous portions so that the sink is constantly urged downwardly in the clamped position. This shape of the spring loops is best shown by the portion of the loop which is designated A in FIGURE 3.

Thus, it is apparent that once the spring clips 22 have been nailed to the drainboard no further tools are required for securing the sink bowl in position. Also, it is apparent that the installer can quickly remove the sink bowl if desired, for instance which he might wish to do if he were to recaulk the sealing material which is normally placed underneath the arcuate edge portion 20 to seal the edge portion and the drainboard along the opening.

Thus, it is clear that an improved snap-in type of sink bowl clamping construction has been described. It must be understood that changes and modifications may be made without departing from the spirit of the invention as disclosed or from the scope thereof as defined in the appended claim.

What is claimed is:

In a snap-in sink structure including a drainboard having an opening defined by a vertical peripherally extending facing edge, a sink bowl positionable within said opening, said sink bowl including a bowl portion, a horizontal rim projecting from said bowl portion, said rim having an underneath edge portion seated on said drainboard, and said bowl portion being spaced inwardly from said facing edge to provide a space therebetween;

(a) a clamping structure in said space for securing said bowl in said drainboard comprising, (b) a plurality of drainboard spring clips, each clip having, (c) a vertical portion engaging said facing edge, (d) said vertical portion having a resilient free end portion rebent upon itself to form a depending resilient bulbous loop having an upward facing opening and providing on each clip a resilient pocket, said pocket having a larger horizontal cross sectional dimension than the width of said upward opening, (e) a resilient tongue connected to said end portion and extending arcuately upwardly and away with respect to said facing edge, (f) means connecting each said vertical portion and said facing edge of the drainboard whereby said spring clips are disposed in said space adjacent said facing edge, (g) connecting means on said sink bowl including (h) at least one vertical support connected to said rim and projecting downwardly into said space for a vertical aligning and interlocking relation, (i) said support having at its lower free end an enlarged horizontally extending bulbous projecting portion conforming generally to said pocket and of greater cross sectional dimension than the upward opening of said clips, (j) whereby while assembling said clips with said connecting means during downward pressure on said sink, said cylindrical portions are snapped through the upward facing openings into the pockets of said clips and retained therein for securely clamping said bowl in fixed position.

References Cited in the file of this patent

UNITED STATES PATENTS

| | | |
|---|---|---|
| 2,351,655 | Aske | June 20, 1944 |
| 2,688,507 | Ashworth | Sept. 7, 1954 |
| 2,888,684 | Icenhower | June 2, 1959 |
| 3,071,780 | Lyon | Jan. 8, 1963 |